United States Patent
Berlinger et al.

(12) 
(10) Patent No.: US 6,541,875 B1
(45) Date of Patent: Apr. 1, 2003

(54) FREE PISTON ENGINE WITH ELECTRICAL POWER OUTPUT

(75) Inventors: Willibald G. Berlinger, Peoria, IL (US); Francis J. Raab, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/572,476

(22) Filed: May 17, 2000

(51) Int. Cl.[7] ............................. F02B 71/00; F02B 71/04
(52) U.S. Cl. .................. 290/1 R; 123/465 C; 123/46 E
(58) Field of Search ...................... 290/1 R, 40 A–40 D

(56) References Cited

U.S. PATENT DOCUMENTS

| | | | | |
|---|---|---|---|---|
| 4,507,579 A | * | 3/1985 | Turner | 310/15 |
| 4,589,380 A | | 5/1986 | Coad | |
| 4,965,864 A | * | 10/1990 | Roth et al. | 310/12 |
| 5,002,020 A | | 3/1991 | Kos | |
| 5,172,784 A | * | 12/1992 | Varela, Jr. | 180/65.4 |
| 5,180,939 A | * | 1/1993 | Rosswurm | 290/1 R |
| 5,347,186 A | * | 9/1994 | Konotchick | 310/17 |
| 5,370,112 A | | 12/1994 | Perkins | |
| 5,418,399 A | * | 5/1995 | Klaue | 290/1 R |
| 5,678,522 A | * | 10/1997 | Han | 123/46 SC |
| 5,788,003 A | | 8/1998 | Spiers | |
| 5,881,559 A | * | 3/1999 | Kawamura | 60/59.7 |
| 5,893,343 A | * | 4/1999 | Rigazzi | 123/46 E |
| 6,199,519 B1 | * | 3/2001 | Van Blarigan | 123/46 A |
| 6,349,683 B1 | * | 2/2002 | Annen et al. | 123/46 E |
| 6,390,785 B1 | * | 5/2002 | Sheyman et al. | 417/225 |
| 6,392,313 B1 | * | 5/2002 | Epstein et al. | 290/52 |
| 6,415,770 B1 | * | 7/2002 | Kojima | 123/511 |
| 6,439,674 B1 | * | 8/2002 | Niino | 303/152 |
| 6,479,964 B2 | * | 11/2002 | Woodroffe et al. | 320/115 |

FOREIGN PATENT DOCUMENTS

| | | |
|---|---|---|
| GB | 2 332 988 | 7/1999 |
| WO | WO 93/10342 | 5/1993 |
| WO | WO 01/40620 A1 * | 6/2000 |

OTHER PUBLICATIONS

1999 SAE Paper "A Numerical Study of a Free Piston IC Engine Operating on Homogeneous Charge Compression Ignition Combustion", S. Scott Goldsborough and Peter Van Blarigan—990619.

* cited by examiner

Primary Examiner—Thomas M. Dougherty
Assistant Examiner—Pedro J. Cuevas
(74) Attorney, Agent, or Firm—Todd T Taylor

(57) ABSTRACT

A free piston internal combustion engine, particularly suitable for use in a vehicle having an electric motor as a prime mover, has a combustion cylinder, a piston reciprocally disposed within the cylinder, and a piston rod coupled with a piston. A linear electric generator/motor includes at least one magnet carried by the piston rod and at least one coil positioned in association with the at least one magnet. An electrical circuit is coupled with each of the at least one coil and a battery. The at least one magnet induces an electrical cutrent within the coil to energize a capacitor within the electrical circuit. The charge from the capacitor may be used to charge the battery. The capacitor and/or battery provides output electrical current which is used to drive the electric motor.

25 Claims, 1 Drawing Sheet

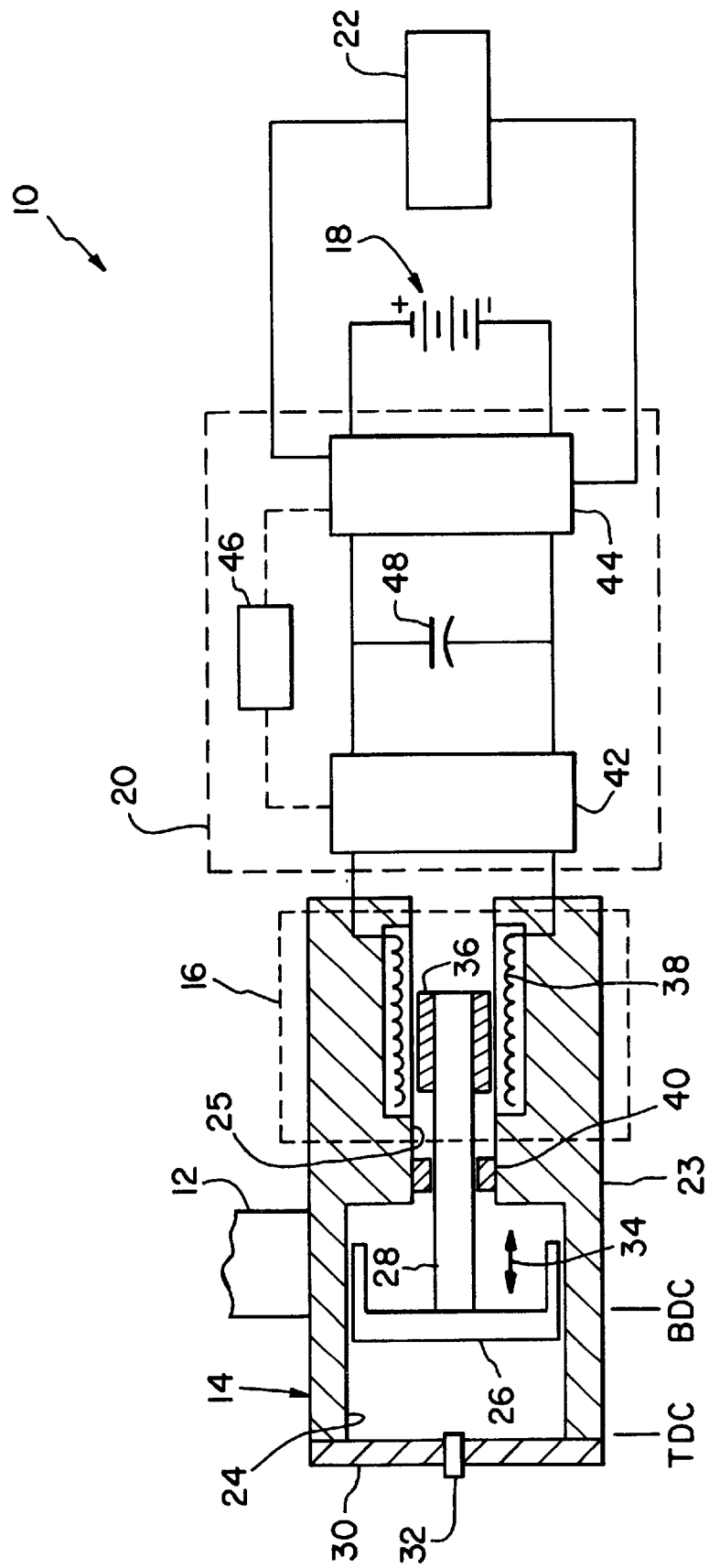

FREE PISTON ENGINE WITH ELECTRICAL POWER OUTPUT

TECHNICAL FIELD

The present invention relates to free piston internal combustion engines and, more particularly, to free piston internal combustion engines having a reciprocating piston rod providing output power.

BACKGROUND ART

Internal combustion engines typically include a plurality of pistons which are disposed within a plurality of corresponding combustion cylinders. Each of the pistons is pivotally connected to one end of a piston rod, which in turn is pivotally connected at the other end thereof with a common crankshaft. The relative axial displacement of each piston between a top dead center (TDC) position and a bottom dead center (BDC) is determined by the angular orientation of the crank arm on the crankshaft with which each piston is connected.

A free piston internal combustion engine (FPE) likewise includes a plurality of pistons which are reciprocally disposed in a plurality of corresponding combustion cylinders. However, the pistons are not interconnected with each other through the use of a crankshaft. Rather, each piston is typically rigidly connected with a plunger rod which is used to provide some type of work output. In a free piston engine with a hydraulic output, the plunger is used to pump hydraulic fluid which can be used for a particular application. An example of a free piston internal combustion engine with a hydraulic output is disclosed in PCT publication number WO 93/10342 (Achten et al.), published May 27, 1993.

One possible use for an FPE as described above is for a prime mover in a motor vehicle. It is also known to provide a motor vehicle with an electric motor as a prime mover. Some motor vehicles are configured as hybrid electric vehicles including both an internal combustion engine as well as an electrical power source for powering the electric motor. The internal combustion engine in such a hybrid vehicle is typically in the form of a crankshaft engine, while the electric power source is in the form of a plurality of batteries or fuel cells. Output power in the form of a crankshaft internal combustion engine or batteries has inherit operational inefficiencies.

The present invention is directed to overcoming one or more of the problems as set forth above.

DISCLOSURE OF THE INVENTION

In one aspect of the invention, a free piston internal combustion engine is provided with a combustion cylinder, a piston reciprocally disposed within the cylinder, and a piston rod coupled with the piston. A linear electrical generator/motor includes at least one magnet carried by the piston rod and at least one coil positioned in association with the at least one magnet. An electrical circuit is coupled with each of the at least one coil and a battery.

In another aspect of the invention, a method of operating a free piston internal combustion engine is provided with the steps of: providing a combustion cylinder, a piston reciprocally disposed within the cylinder, and a piston rod coupled with the piston; providing a linear electric generator/motor including at least one magnet carried by the piston rod and at least one coil positioned in association with the at least one magnet; providing a battery and a capacitor; coupling the at least one coil with at least one of the battery and the capacitor to move the piston during a compression stroke of the piston; and coupling the at least one coil with the capacitor during an expansion stroke of the piston.

BRIEF DESCRIPTION OF THE DRAWINGS

The sole FIGURE is a schematic illustration of an embodiment of a work unit, including an embodiment of a free piston internal combustion engine of the present invention.

BEST MODE FOR CARRYING OUT THE INVENTION

Referring now to the drawing, there is shown an embodiment of a work unit 10 of the present invention, which generally has a frame 12, internal combustion engine 14, linear electric generator/motor 16, battery 18, electrical circuit 20 and electrical load 22.

Electrical load 22 may be any load requiring electrical power, such as an electric motor, etc. Work unit 10 is configured to utilize electrical load 22. In the embodiment shown, work unit 10 is in the form of a vehicle and electrical load 22 is a prime mover for causing movement of the vehicle. Work unit 10 includes frame 12, which carries internal combustion engine 14.

Internal combustion engine 14 is in the form of an FPE 14 which includes a combustion cylinder 24, a piston 26 reciprocally disposed within combustion cylinder 24, and a piston rod 28 coupled with piston 26. Housing 23 defines each of combustion cylinder 24 and generator/motor cylinder 25. An annular bearing 40 carried within housing 23 guides piston rod 28 within generator/motor cylinder 25. Combustion cylinder 24 is covered by a head 30, in which a fuel injector 32 is mounted. Piston 26 is reciprocally movable between a top dead center (TDC) position (adjacent head 30) and a bottom dead center (BDC) position during an expansion stroke; and is movable between the BDC and TDC position during a compression stroke, as indicated by double-headed directional arrow 34.

In the embodiment shown in the drawing, FPE 14 includes only a single combustion cylinder 24 and corresponding single piston 26 for purposes of simplicity and clarity. However, it is to be understood that FPE 14 likely includes a plurality of combustion cylinders 24 and corresponding pistons 26 which are configured and operate in a similar manner.

Generator/motor 16 has at least one magnet 36 carried by piston rod 28, and at least one coil 38 positioned in association with magnet 36. In the embodiment shown, the at least one magnet 36 is in the form of a plurality of permanent magnets 36 carried by piston rod 28. Coil 38, in the embodiment shown, is in the form of a continuous winding coil which surrounds generator/motor cylinder 25. If current is applied to coil 8 when piston head 26 is at or near a BDC position, piston rod 28; and piston 26 are caused to move toward a TDC position during a compression stroke. On the other hand, if combustion occurs within combustion cylinder 24 and piston 26 moves from a TDC position to a BDC position, magnets 36 traveling past coil 38 causes an electrical current to be induced within coil 38.

Battery 18 may be of conventional design, such as a lead-acid battery, gel battery, fuel cell, etc.

Electrical circuit 20 includes first electronic module 42, second electronic module 44, third electronic module 46 and capacitor 48.

Capacitor 48 is coupled between first electronic module 42 and second electronic module 44. Capacitor 48 stores and discharges electrical energy, as will be described hereinafter.

First electronic module 42 controls electrical current flow between coil 38 and capacitor 48. Additionally, first electronic module 42 includes an alternating current (AC) to direct current (DC) converter to convert AC current which is induced within coil 38 into DC current utilized by capacitor 48. First electronic module 42 may also include a DC to AC converter for converting dc power generated by capacitor to AC power utilized to drive piston 26 during a compression stroke.

First electronic module 42 has a compression stroke charge circuit adapted to control electrical current flow from capacitor 48 to coil 38 during a compression stroke of piston 26; and an expansion stroke charge circuit adapted to control electrical current flow from coil 38 to capacitor 48 during an expansion stroke of piston 26. First electronic module 42 may be configured with multiple different configurations to provide this functionality, as will be appreciated by those skilled in the art. For example, first electronic module 42 may include hardware, firmware and/or software to provide electrical current flow control between coil 38 and capacitor 48, as described above.

Second electronic module 44 is coupled with each of capacitor 48, battery 18 and load 22, and controls current flow therebetween. Second electronic module 44 includes a charge circuit adapted to control electrical current flow between capacitor 48 and battery 18 to charge either of capacitor 48 or battery 18. For example, electrical current from capacitor 48 may be utilized to charge battery. 18. Contrarily, electrical current from battery 18 may be utilized to charge capacitor 48 for ultimately firing piston 26 during a compression stroke. Moreover, second electronic module 44 includes a power supply circuit which is adapted to control electrical current flow from battery 18 and/or capacitor 48 used as input electrical power to load 22.

The charge circuit and power supply circuit of second electronic module 44 may have any of a number of different configurations, as will be appreciated by those skilled in the art. For example, second electronic module 44 may be configured with hardware, firmware and/or software to provide the charging and power supply functionality as described above.

Third electronic module 46 is configured as an electronic control module (ECM) in the embodiment shown, and generally controls the overall operation of first electronic module 42 and second electronic module 44. For example, third electronic module 46 may receive an input signal corresponding to a position of piston 26 to control the timing and operation of each first electronic module and second electronic module 44 to thereby provide pulse-pause modulation of internal combustion engine 14.

Industrial Applicability

During use, second electronic module 44, through control by third electronic module 46, charges capacitor 48 with electrical current from battery 18. The charge from capacitor 48 is received at first electronic module 42 and converted to AC electrical power, which is applied to coil 38. When coil 38 is energized, magnets 36 act as a solenoid and drive piston 26 toward a TDC position during a compression stroke. Fuel is injected into combustion cylinder 24 using fuel injector 32 at or near a TDC position of piston 26. Combustion occurs and drives piston 26 toward a BDC position during an expansion stroke. Magnets 36 travel past coil 38 and induce an electrical current therein. The electrical current is converted from AC to DC within first electronic module 42, and thereafter used to charge capacitor 48. second electronic module 44, under control of third electronic module 46, directs the electrical charge from capacitor 48 to battery 18 and/or electrical load 22. Second electronic module 44 may also direct electrical current from battery 18 to electrical load 22.

Other aspects, objects and advantages of this invention can be obtained from a study of the drawings, the disclosure and the appended claims.

What is claimed is:

1. A work unit, comprising:
   a frame;
   a housing carried by said frame, said housing defining each of a combustion cylinder and a generator/motor cylinder,
   an internal combustion engine disposed within said housing, said combustion engine including said combustion cylinder, a piston reciprocally disposed within said combustion cylinder, and a piston rod coupled with said piston;
   a linear electric generator/motor located within said housing, said linear electric generator/motor including at least one magnet carried by said piston rod and at least one coil positioned in association with said at least one magnet, said piston rod and said at least one magnet carried thereby reciprocally disposed within said generator/motor cylinder;
   a battery,
   an electrical load; and
   an electrical circuit coupled with each of said at least one coil, said battery and said load to selectively supply current from said battery to said at least one coil and from said at least one coil to at least one if said battery and said load.

2. The work unit of claim 1, said electrical circuit controlling electrical current flow to and from said generator/motor.

3. The work unit of claim 2, said electrical circuit controlling electrical current flow to and from said battery.

4. The work unit of claim 3, said electrical circuit controlling electrical current flow to said load.

5. The work unit of claim 1, said electrical circuit including a first electronic module, a second electronic module, and a capacitor coupled between said first electronic module and said second electronic module.

6. The work unit of claim 5, said first electronic module including:
   a compression stroke charge circuit adapted to control electrical current flow from said capacitor to said coil; and
   an expansion stroke charge circuit adapted to control electrical current flow from said coil to said capacitor.

7. The work unit of claim 6, said first electronic module including a converter adapted to convert at least one of direct current to alternating current, and alternating current to direct current.

8. The work unit of claim 7, said first electronic, control module including a converter adapted to convert each of direct current to alternating current, and alternating current to direct current.

9. The work unit of claim 5, said second electronic module including:
   a charge circuit adapted to control electrical current flow between said capacitor and said battery to charge either of said battery and said capacitor; and a power supply circuit adapted to control electrical current flow from at least one of said battery and said capacitor to said load.

10. The work unit of claim 9, including a third electronic module coupled between said first electronic module and said second electronic module, said third electronic module adapted to control timing of said charge circuit and said power supply circuit.

11. The work unit of claim 10, said third electronic module including an electronic control module.

12. The work unit of claim 1, said load including an electric motor.

13. A free piston internal combustion engine, comprising:
   a housing defining each of a combustion cylinder and a generator/motor cylinder;
   a piston reciprocally disposed within said combustion cylinder;
   a piston rod coupled with said piston;
   a linear electric generator/motor located within said housing, said linear electric generator/motor including at least one magnet carried by said piston rod and at least one coil positioned in association with said at least one magnet, said piston rod and said at least one magnet carried thereby reciprocally disposed within said generator/motor cylinder;
   a battery; and
   an electrical circuit coupled with each of said at least one coil and said battery to selectively supply current from said battery to said at least one coil and from said at least one coil to said battery.

14. The free piston engine of claim 13, said electrical circuit adapted to control electrical current flow to and from said generator/motor.

15. The free piston engine of claim 14, said electrical circuit adapted to control electrical current flow to and from said battery.

16. The free piston engine of claim 13, said electrical circuit including a first electronic module, a second electronic module, and a capacitor coupled between said first electronic module and said second electronic module.

17. The free piston engine of claim 16, said first electronic module including:
   a compression stroke charge circuit adapted to control electrical current flow from said capacitor to said coil; and
   an expansion stroke charge circuit adapted to control electrical current flow from said coil to said capacitor to charge said capacitor.

18. The free piston engine of claim 17, said first electronic module including a converter adapted to convert at least one of direct current to alternating current, and alternating current to direct current.

19. The free piston engine of claim 18, said first electronic module including a converter adapted to convert each of direct current to alternating current, and alternating current to direct, current.

20. The free piston engine of claim 16, said second electronic module including:
   a charge circuit adapted to control electrical current flow between said capacitor and said battery to charge either of said battery and said capacitor; and
   a power supply circuit adapted to control output electrical current flow from said electrical circuit originating from at least one of said battery and said capacitor.

21. The free piston engine of claim 20, including a third electronic module coupled between said first electronic module and said second electronic module, said third electronic module controlling timing of said charge circuit and said power supply circuit.

22. A method of operating a free piston internal combustion engine, comprising the steps of:
   providing a housing defining each of a combustion cylinder and a generator/motor cylinder;
   providing a piston reciprocally disposed within said combustion cylinder and a piston rod coupled with said piston;
   providing a linear electric generator/motor within said housing, said linear electric generator/motor including at least one magnet carried by said piston rod and at least one coil positioned in association with said at least one magnet, said piston rod and said at least one magnet carried thereby reciprocally movable within said generator/motor cylinder;
   providing a battery and a capacitor,
   coupling said at least one coil with at least one of said battery and said capacitor to move said piston during a compression stroke of said piston by supplying current from at least one of said battery and said capacitor to said coil; and
   coupling said at least one coil with said capacitor during an expansion stroke of said piston and supplying current from said at least one coil to said capacitor.

23. The method of claim 22, including the steps of:
   coupling a first electronic module with said at least one coil;
   coupling a second electronic module with said battery; and
   coupling said capacitor between said first electronic module and said second electronic module.

24. The method of claim 23, including the steps of:
   controlling electrical current flow from said capacitor to said coil using said first electronic control module during said compression stroke of said piston; and
   controlling electrical current flow from said coil to said capacitor to charge said capacitor using said first electronic control module during said expansion stroke of said piston.

25. The method of claim 23, including the steps off:
   controlling electrical current flow between said capacitor and said battery for charging either of said battery and said capacitor using a charge circuit in said second electronic control module; and
   controlling electrical current flow from at least one of said battery and said capacitor to an external load using a power supply circuit in said second electronic control module.

* * * * *

UNITED STATES PATENT AND TRADEMARK OFFICE
CERTIFICATE OF CORRECTION

PATENT NO. : 6,541,875 B1
DATED : April 1, 2003
INVENTOR(S) : Willibald G. Berlinger et al.

It is certified that error appears in the above-identified patent and that said Letters Patent is hereby corrected as shown below:

Column 4,
Line 17, delete "," and insert -- ; --

Column 5,
Line 58, delete ","

Column 6,
Line 52, delete "off" and insert -- of --

Signed and Sealed this

Nineteenth Day of August, 2003

JAMES E. ROGAN
*Director of the United States Patent and Trademark Office*